United States Patent [19]
Kreuter et al.

[11] 3,801,006

[45] Apr. 2, 1974

[54] CONDITION RESPONSIVE PARA-METER CONTROL MEANS

[75] Inventors: Kenneth G. Kreuter, Winnipeg, Manitoba, Canada; Klaus P. Mueller, Goshen, Ind.

[73] Assignee: Robertshaw Controls Company, Richmond, Va.

[22] Filed: Nov. 6, 1972

[21] Appl. No.: 304,020

Related U.S. Application Data

[62] Division of Ser. No. 109,015, Jan. 22, 1971, which is a division of Ser. No. 884,947, Dec. 15, 1969, Pat. No. 3,575,343, which is a division of Ser. No. 594,851, Nov. 16, 1966.

[52] U.S. Cl. ................................. 236/1 C, 236/47
[51] Int. Cl. ................... G05b 11/48, G05d 23/275
[58] Field of Search ............... 236/47, 87, 82, 1 C; 165/26

[56] References Cited
UNITED STATES PATENTS

| | | | |
|---|---|---|---|
| 3,047,233 | 7/1962 | Scharpf | 236/47 X |
| 3,455,505 | 7/1969 | Beatenbough et al. | 236/87 |

*Primary Examiner*—William E. Wayner
*Attorney, Agent, or Firm*—Candor, Candor & Tassone

[57] ABSTRACT

A unitary, multiple diaphragm structure is provided which includes integral valve means and flow passages, the structure being substantially entirely composed of a flexible resilient material. Additional rigid inserts are integrally molded into the basic structure to provide additional valving and seating arrangements for desired functional adaptability. The diaphragm structure is combined with hollow housing structures comprised of stacked plates or the like for mounting the peripheral portions of the multiple diaphragms of the unitary structure. Selective porting and pressure connections in the housing structures effect a family of differential pressure responsive modules or devices such as relays, comparators, and the like. A simplified temperature to pressure transducer is provided in which a compound bimetal spring selectively retains a spherical valve in an exhaust port to provide a modulated pressure output as a function of temperature changes. The transducer and family of differential pressure responsive modules are combined to provide a plurality of parameter control systems having a wide variety of operating modes. Several of the systems are convertible from one operating mode to another by merely changing the supply pressure magnitudes. The transducer is characterized by the fact that it requires no changeover adjustment to adapt it to the multiple modes of the systems.

16 Claims, 18 Drawing Figures

CONDITION RESPONSIVE PARA-METER CONTROL MEANS

This application is a divisional patent application of its copending parent application, Ser. No. 109,015, filed Jan. 22, 1971, which, in turn, is a divisional patent application of its copending parent application, Ser. No. 884,947, filed Dec. 15, 1969, now U.S. Pat. No. 3,575,343, which in turn is a divisional patent application of its parent copending patent application, Ser. No. 594,851, filed Nov. 16, 1966.

This invention relates to condition responsive parameter control means, and more particularly to new and novel elements, components, concepts and systems including same, wherein a fluid control medium such as air under pressure provides the operating capability for the systems.

It is an object of this invention to provide new and novel diaphragm means for fluid operated control components and the like.

It is another object of this invention to provide new and novel fluid operated control components having an optimally minimum number of component parts.

Another object of this invention is to provide new and novel fluid operated control components having optimized simplicity of structure and design, whereby the production cost of such components is materially reduced.

Another object of this invention is to provide new and novel fluid operated control systems.

Still another object of this invention is to provide new and novel integral diaphragm assemblies for fluid operated control components requiring a plurality of flexible wall or diaphragm means, said assemblies being readily adaptable to a wide variety of control functions.

Still another object of this invention is to provide new and novel fluid operated control components including new and novel pressure-responsive diaphragm assemblies.

Still another object of this invention is to provide new and novel fluid operated control systems convertible between various modes of operation by the sole expedients of pressure and channeling variations in the fluid control medium, whereby optimum simplicity of mechanical components is provided and changeover procedures in mechanical components in associated transducer means and the like are obviated.

Yet another object of this invention is to provide a new and novel family of fluid operated control components or modules which can be combined in various combinations to effect a family of control systems having a wide variety of operating modes.

Yet another object of this invention is to provide new and novel means in fluid operated control systems for selectively adjusting the throttling range of the said systems.

These and other objects of this invention will become more fully apparent with reference to the following specification and drawings which relate to several preferred embodiments of this invention.

DIAPHRAGM ASSEMBLIES AND RELATED CONTROL COMPONENTS

Figure 1:
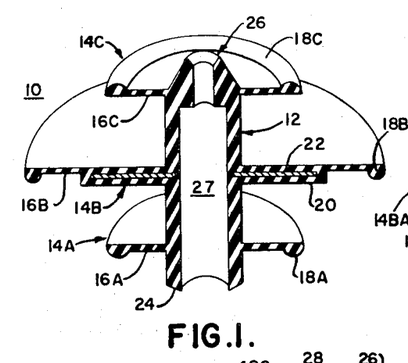
FIG. 1 is a perspective in partial cross-section of one embodiment of a diaphragm assembly of the present invention.

Referring in detail to the drawings and more particularly to FIG. 1, a first embodiment 10 of the diaphragm assembly of the present invention is shown as including a main body portion 12, illustrated as a hollow elongated cylindrical stem or spindle, having a plurality of radially extending, axially spaced, integrally formed radial diaphragm elements 14A, 14B and 14C thereon.

Each of the diaphragms 14A, 14B and 14C and the main body portion 12 are comprised of the same resilient material; the diaphragms 14A, 14B and 14C comprising circular flexible webs 16A, 16B and 16C, respectively having raised annular beads or sealing ridges 18A, 18B and 18C around the respective peripheries thereof on at least one side of the said webs 16A, 16B and 16C.

One of the diaphragms 14B, as illustrated the central diaphragm having the largest area defined by its web 16B, is reinforced by the provision of a thickened web portion 20 extending integrally from the main body portion 12 of the diaphragm assembly 10, radially outward to a point of lesser radius than the entire web 16B. Additionally, if desired or needed, additional strength may be provided to the thickened web portion 20 by an integrally molded metal washer 22 or the like extending from within the main body portion 12 radially outward in the thickened web portion 20.

It is emphasized that the entire diaphragm assembly 10, is a unitary structure formed by molding or the like from resilient, flexible material such as natural or synthetic rubber, vinyl or other plastics, or the like, with the exception of any integrated additional reinforcing means such as the metal washer 22.

The main body portion or stem 12 is provided at its lower end with an annular valve surface 24 and at its upper end with an annular valve surface 26, both being formed directly in the material of said stem 12. The valve surfaces 24 and 26 are at opposite ends of an axial bore 27 in the stem 12 of the diaphragm assembly 10.

Figure 2:
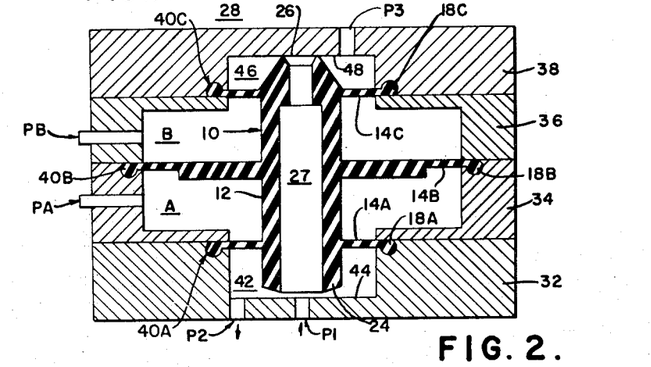
FIG. 2 is a cross-sectional structural schematic of a fluid operated diverting relay of the present invention incorporating the diaphragm assembly of FIG. 1.

Referring now to FIG. 2, a fluid pressure operated control component comprising a fluid comparator 28 including the diaphragm assembly 10 will be described.

The comparator 28 is shown as comprising the diaphragm assembly 10 of FIG. 1 secured by means of a plurality of stacked plates 32–38, the said plates including a base plate 32, first and second mid-plates 34 and 36 and a top or cap plate 38, stacked one upon the other in that order. The plates 32–38 are cut away internally to define pressure chambers bounded by the respective diaphragms 14A, 14B and 14C of the diaphragm assembly 10. Further, the base plate 32, first mid-plate 34 and the cap plate 38 have the cut-away portions thereof bounded by peripheral sealing grooves 40 in the plate adjacent faces thereof, the said grooves 40 receiving the annular beads or sealing ridges 18A, 18B and 18C on the respectively associated diaphragms 14A, 14B and 14C. The ridges 18A, 18B and 18C are respectively compressed into the sealing grooves 40A, 40B and 40C by the clamping action of the ungrooved surface portion of the respectively adjacent juxtaposed stacked plates 32–38, the latter being held in place such as by clamping, bolting, welding, or the like.

The base plate 32 includes a pressure inlet P1, and a first pressure outlet P2, both communicating with a first output pressure chamber 42 in the said base plate 32 bounded on one side by the diaphragm 14A. The first output pressure chamber 42 has a flat bottom wall 44 engageable with the annular valve surface 24 on the stem 12 of the diaphragm assembly 10, the said valve surface 24 being annularly disposed with and adapted to selectively connect the pressure inlet P1 with the first output pressure chamber 42, the said inlet P1 comprising a port through the chamber wall 44. Thus, the inlet P1 is in substantial axial alignment and communication with the hollow bore 27 of the stem portion 12 of the diaphragm assembly 10.

The cap plate 38 includes a second pressure outlet P3 communicating with a second output pressure chamber 46 in the said cap plate 38 bounded on one side by the diaphragm 14C.

The second output pressure chamber 46 has a flat outer wall 48 engageable with the second annular valve surface 26 on the stem 12 of the diaphragm assembly 10, whereby the hollow bore 27 in the said stem 12 is selectively placed in communication with the second output chamber 46. The second outlet P3 comprises a port through the chamber wall 48. Thus, the second outlet P3 is also selectively placed in communication with the hollow bore 27 in the diaphragm assembly stem 12.

First and second pressure comparator chambers A and B are provided in the first and second midplates 34 and 36, respectively, the diaphragm 14B comprising a common dividing wall for both said comparator chambers. The first comparator chamber A is bounded on its other side by the diaphragm 14A and the second comparator chamber B is bounded on its other side by the diaphragm 14C.

First and second comparator pressure inlets PA and PB communicate, respectively, with the first and second comparator chambers A and B and comprise ports through the first and second midplates 34 and 36.

In operation, supply pressure from a suitable source, not shown, is applied to the pressure inlet P1 and first and second input pressures, from other suitable sources not shown, to be compared, are applied to the first and second comparator inlets PA and PB, respectively.

Since the upper and lower diaphragms 14A and 14B are shown as being of equal area, and since the central diaphragm 14B is common to both comparator chambers A and B, the forces of the supply pressure in the first and second output chambers 42 and 46 acting through the said upper and lower diaphragms 14A and 14C on the diaphragm assembly stem 12 is self-balancing and any resultant force on the assembly stem 12 is a function of the difference in the pressures in the first and second comparator chambers A and B. Thus, if the pressure in the first comparator chamber A has the greatest magnitude, the resultant force of unbalance drives the assembly stem upward, seating the second annular valve surface 26 on the wall 48 of the second outlet chamber 46, causing supply pressure to be transmitted from the inlet P1 to the first outlet chamber 42 and out through the first pressure outlet P2.

Conversely, if the pressure in the second comparator chamber B has the greatest magnitude, the assembly stem 12 will be shifted downward, seating the first annular valve surface 24 on the wall 44 of the first outlet chamber 42, concentrically of the pressure inlet P1, causing supply pressure to be transmitted through the axial bore 27 of the assembly stem 12 to the second output chamber 46 and out through the second pressure output P3.

Thus, the relative magnitudes of the two compared pressures of the first and second comparator chambers A and B are sensed by the comparator relay 28 and evidenced by the selective diversion of supply pressure from the first outlet port P2 to the second outlet port P3 and vice-versa.

Figure 3A:
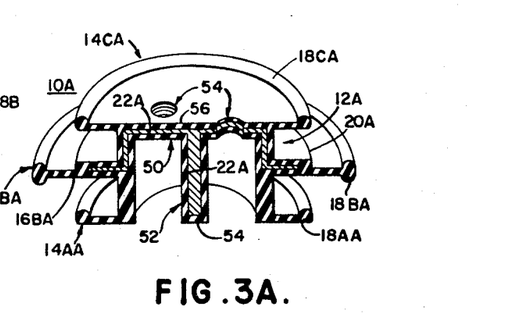
FIG. 3A is a cross-sectional perspective of a second embodiment of a diaphragm assembly of the present invention.
Figure 3B:
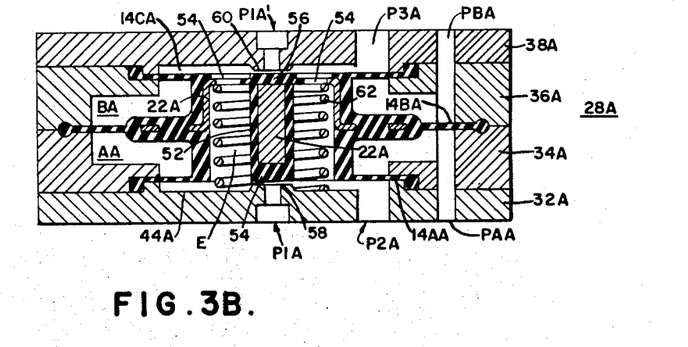
FIG. 3B is a cross-sectional structural schematic of another fluid operated diverting relay of the present invention incorporating the diaphragm assembly of FIG. 3A.

Referring to FIGS. 3A and 3B a second embodiment of a pressure comparator comprising a fluid diverting relay 28A will now be described. Similar parts to FIGS. 1 and 2 will be identified by like numerals followed by the suffix A.

A unitary diaphragm assembly 10A including lower, intermediate and upper diaphragm portions 14AA, 14BA and 14CA, respectively, is mounted in a cavity contained in a stacked plate combination of a base plate, first and second midplates and cap plate 32A, 34A, 36A and 38A, respectively.

The diaphragm assembly 10A includes an open ended cylindrical assembly stem 12A open at its lower end and having its closed upper end wall 50 coinciding with the upper diaphragm 14CA. An internally coextensive, coaxial valve stem 52 extends downward from the closed end wall 50 of the assembly stem 12A and may, if desired, extend slightly beyond the open lower end of the said assembly stem 12A. Further, a plurality of flow ports 54 may be provided through the upper diaphragm 14CA and stem end wall 50, for a purpose to be hereinafter described. The said flow ports 54 being radially disposed with reference to the coaxial valve stem 52.

A rigid reinforcing member 22A of metal or the like is integrally incorporated in the assembly 10A and is conformal with the assembly stem 12A, the walls of the said stem 12A intermediate the upper and intermediate diaphragms 14CA and 14BA and thence flanged radially outward into the thickened portion 20A of the web portion 16BA of the intermediate diaphragm 14BA. The reinforcing member 22A may be entirely covered with the resilient material comprising the diaphragm assembly 10A, as shown in FIG. 3A, or may be partially exposed within the closed wall and upper stem area of the assembly stem 12A, as shown in FIG. 3B. In either case, that portion within the valve stem 52 is covered and includes a thickened resilient first valve surface 54 on the lower end of the valve stem 52. The surface of the upper diaphragm 14CA immediately above the upper end of the valve stem 52 comprises a second valve surface 56 and may be thickened to afford more resilience as shown in FIG. 3B.

The first and second comparator chambers AA and BA and the first and second comparative pressure inputs PAA and PBA, respectively, are arranged in the manner described with reference to the embodiments of FIGS. 1 and 2.

To provide for versatility of function, to be hereinafter more fully described, the first and second pressure outputs P2A and P3A communicate, via the flow ports 54 in the diaphragm assembly 10A with a common output chamber E, either or both of the said outputs BA and P3A being usable as desired.

First and second supply pressure inlets P1A and P1A' are located, respectively, in the base and cap plates 32A and 38A in the form of flow ports having annular valve seats 58 and 60, respectively, extending inwardly toward and adapted to be engaged by the resilient valve surfaces 54 and 56, respectively, at opposite ends of the valve stem 52 of the diaphragm assembly 10A.

Further, as shown in FIG. 3B, the diverting relay 28A may include a biasing means such as a compression spring 62 coaxially disposed about the valve stem 52 and abutting both the closed end wall 50 of the assembly stem 10A and the inner wall 44A of the bottom plate 32A. Thus, the force of the spring 62 effects an upward thrust on the diaphragm assembly 10A, placing a normally open constraint on the first supply inlet P1A and a normally closed constraint on the second supply inlet P1A'.

In operation, assuming the pressure input ports P1A and P1A' are connected with suitable sources of supply pressure and the comparator pressure ports PAA and PBA are connected to suitable signal pressure sources, if the pressure in the second comparator chamber BA exceeds the pressure in the first comparator chamber AA sufficiently to overbalance the upward force of the spring 62 and the resultant upward force of the pressure AA on the middle diaphragm 14BA, the valve stem 52 of the diaphragm assembly 10A will be driven downwardly engaging the second valve surface 54 with the first annular valve seat 58 and will disengage the second valve surface 56 from the second annular valve seat 60. Thus, supply pressure from the second pressure input port P1A' will be admitted to the output chamber E and will appear at the output ports P2A and P3A. As previously stated, either or both of the output ports P2A and P3A may be utilized depending upon the systems application of the diverting relay 28A.

If the differential between the pressure in the second comparator chamber BA and that in the first comparator chamber AA is less than that necessary to satisfy the above-defined conditions, the force of the spring 62 will seat the second valve surface 56 on the second valve seat 60, closing of the second supply port P1A' and admitting pressure from the first supply port P1A to the output chamber E.

If desired, for further versatility of application, the spring 62 may be removed and a lesser differential will be required to effect operation of the diverting relay 28A.

Figures 4, 5A:
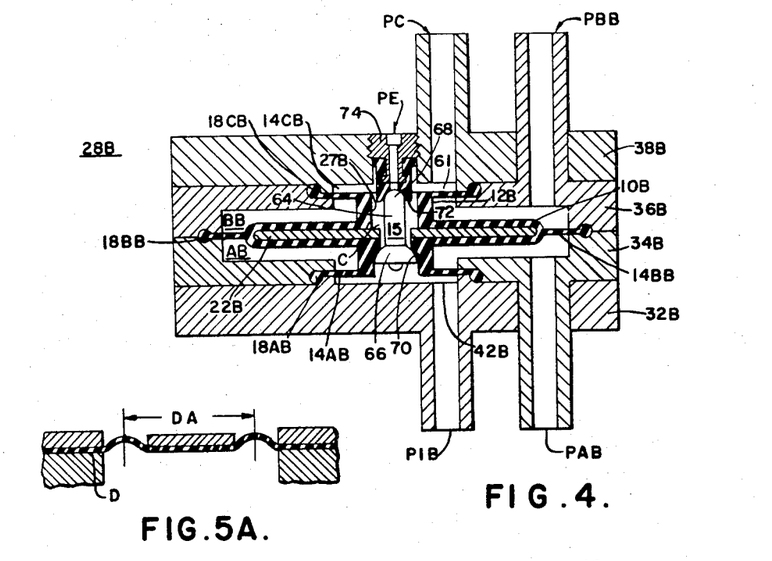
FIG. 4 is a cross-sectional structural schematic of a control pressure modulating comparator relay of the present invention incorporating a relay ratio selecting means of the present invention and a third embodiment of a diaphragm assembly of the present invention.
FIGS. 5A, 5B and 5C are schematic illustrations of the effect provided by the relay ratio adjusting means of FIG. 4.

Referring now to FIG. 4, a modulating comparator relay 28B, including a unitary diaphragm assembly 10B in combination with a conventional poppet realy valve 64 having first and second spherical valve surfaces 66 and 68, will be described. Like parts to FIGS. 1, 2, 3 and 4 will bear like numerals to FIGS. 1 and 2 with the suffix B.

The diaphragm assembly 10B includes diaphragms 14AB, 14BB and 14CB mounted between stacked plates 32B–38B as previously defined with reference to FIG. 2. In the embodiment of FIG. 4, however, the stem portion 12B includes a through bore 27B which is counterbored at one end to form an internal valve seat 70 conformal with and adapted to engage the first valve surface 66 on the relay valve 64.

The opposite end of the bore 27B in the diaphragm stem 12B is sufficiently enlarged to telescopically receive a second valve seat 72 conformal with and adapted to engage the second valve surface 68 on the relay valve 64. The said second valve seat 72 comprises an axially bored resilient member which is snap-coupled to an axially bored and axially adjustable threaded nipple 74, threadably inserted in the cap plate 38B of the comparator relay 28B in axial alignment with the relay valve 64. The axial bores in the second valve seat 72 and nipple 74 are aligned and comprise an exhaust port PE for the comparator relay 28B.

The comparator relay includes a supply pressure input P1B connected with a supply chamber 42B; a branch or control pressure outlet PC connected with a control pressure chamber C; first and second signal pressure inputs PAB and PBB connected, respectively, with first and second comparator chambers AB and BB.

The control chamber C is defined by the cap plate 38B, upper diaphragm 14CB and hollow bore 27B of the diaphragm stem 12B above the first valve seat 70; the said first valve 66 of the relay valve 64 and the said first valve seat 70 controlling the transfer of pressure from the supply chamber 42B into the control chamber C.

In regard to the coaction of the first valve 66 and first valve seat 70, it should be noted that the reinforcing insert 22B in the intermediate diaphragm 14BB extends radially inward of the bore 27B to reinforce the said first valve seat 70 against the engaging action of the first valve 66.

In operation, assuming a balanced, quiescent condition in the comparator relay 28B in which the pressures in the first comparator chamber AB and the supply chamber 42B generate a force on the diaphragm assembly 10B equal to that generated thereon by the pressures in the control chamber C and the second comparator chamber BB, and further assuming the supply inlet P1B and supply chamber 42B are supplied by a suitable pressure source, both the first and second relay valve surfaces 66 and 68 will be seated, respectively, on the first and second valve seats 70 and 72. Thus, the control pressure in the control chamber C will be at some previously constrained value.

Now, should one of the pressures in the comparator chambers vary in an amount to satisfy the response sensitivity of the comparator relay 28B, an axial displacement of the diaphragm stem 12B will be effected.

As shown, if the pressure in the first comparator chamber AB increases (or that in the second comparator chamber BB decreases), the resultant force from the pressure differential effected across the intermediate diaphragm 14BB will force the diaphragm stem 12B upward and unseat the first valve 66 from the first valve seat 70. Consequently, supply pressure will flow through the bore 27B in the said stem 12B into the control chamber C and out the control pressure outlet port PC until such time as the pressure in the control chamber C increases in an amount sufficient to act on the upper diaphragm 14CB and fully oppose the resultant upward force on the diaphragm stem 12B, at which point the stem 12B will be driven fully downward and constrain the first valve seat 70 to re-engage the first valve 66 of the relay valve 64.

Should the pressure differential between the comparator chambers reverse and effect a resultant downward force on the diaphragm assembly 10B, the diaphragm 12C will constrain the first valve seat 70 to drive the relay valve 64 downward, unseating the second valve 68 of the said relay valve 64 from the second valve seat 72. Consequently, the pressure in the control chamber C will be exhausted through the exhaust port PE until such time as the pressure therein has been reduced to a value permitting the said second valve 68 to re-engage the said second valve seat 72, at which time the comparator relay 28B will once more be balanced and the control pressure at its output port PC modulated in accordance with the change in pressure differential between the comparator chambers AB and BB thereof.

The proportional band or throttling range of the comparator relay 28B is selectively adjustably by means of the novel axially displaceable second valve seat 72. This displacement is effected by the provision of an allen socket or the like in the exhaust port PE whereby the threaded nipple 74 may be axially adjusted in the cap plate 38B.

Figure 5B:
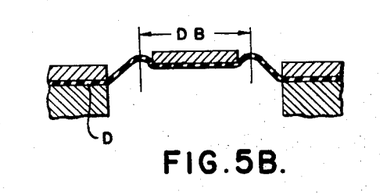
Figure 5C:
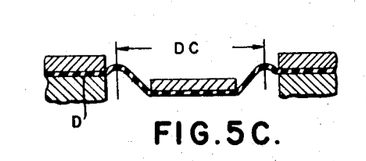

In explanation, referring to FIGS. 5A, 5B and 5C in addition to FIG. 4, a schematic diaphragm D is shown in a normal, undisturbed, quiescent position in FIG. 5A as having an effective area diameter DA; in an upwardly displaced quiescent condition in FIG. 5B as having a smaller effective area diameter DB (relative to the normal diameter DA); and in a downwardly displaced quiescent condition as having a greater effective area diameter DC (relative to the normal DA); wherein all of the foregoing effective area diameters relate to the response of the diaphragm D to pressure acting upwardly on the diaphragms as shown. Thus, by varying the effective area diameter, and hence the effective area of the diaphragm D, the resultant force on the said diaphragm in response to a given pressure will also vary.

Accordingly, axial displacement of the second valve seat 74 in FIG. 4 will constrain the diaphragm assembly 10B to assume selectively variable positions at which a quiescent state of the relay 28B can exist, changing the effective areas of the diaphragms 14AB, 14BB and 14CC with respect to given variations in the several pressures acting on the said diaphragm assembly 10B and thereby changing the respectively resulting forces generated thereon in response thereto.

PRESSURE REGULATOR VALVE

Figure 6:
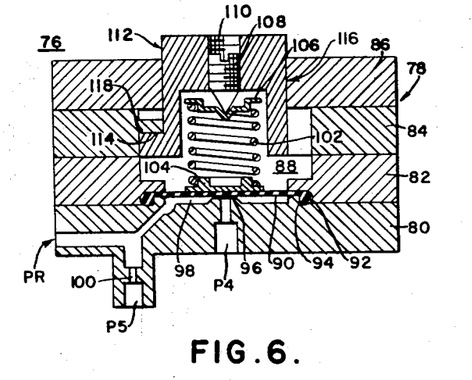
FIG. 6 is a cross-sectional structural schematic of a pressure regulating means of the present invention.
Figure 6A:
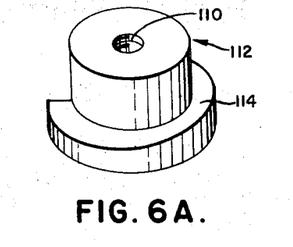
FIG. 6A is an enlarged perspective view of an adjusting cam means in the pressure regulator of FIG. 6.

Referring in detail to FIGS. 6 and 6A, a pressure regulator valve 76 is shown as including a housing 78 comprising a base plate 80, first and second mid-plates 82 and 84 and a cap plate 86 defining an internal cavity 88.

Within the cavity 88 and across the inner end thereof adjacent the base plate 80 is a flexible regulator diaphragm 90 having an integral annular bead 92 thereon compressibly receivable in an annular groove 94 between the base plate 80 and first mid-plate 82.

The base plate 80 is provided with an exhaust port P4 therethrough having raised annular exhaust valve seat 96 at its inner end immediately adjacent to and adapted to be engaged by the central portion of the regulator diaphragm 90. In addition, a supply pressure port P5 and a regulated output pressure port PR are provided in the base plate 80 in communication with a regulator chamber 98 between the base plate 80 and regulator diaphragm 90; the said regulator chamber 98 also being in selective communication with the exhaust port P4 as controlled by the disposition of the regulator diaphragm 90 in relation to the annular exhaust valve seat 96. A flow restriction 100 is placed in-line between the supply pressure inlet port P5 and the regulator chamber 98.

A regulator spring 102 in the form of a helical compression spring or the like is mounted in the internal cavity 88 of the regulator 76 and is constrained between a diaphragm button 104 mounted on the central portion of the regulator diaphragm 90 at its lower end and an adjustable stop 106 juxtaposed with an axially displaceable spring adjusting screw 108 at its upper end.

The adjusting screw 108 is threadably engaged in an internally threaded axial bore 110 in a rotary pressure control knob 112 which is cylindrical in end view and includes a radially disposed cam surface 114 about a portion of its periphery at the inner end thereof within the internal cavity 88 of the regulator 76. The upper end of the control knob 112 is journalled in a cylindrical bore 116 in the cap plate 86 and extends outwardly therethrough.

Since the regulator spring 102 presses axially upward on the control knob 112 via the adjusting screw 108, a cooperating boss or detent 118 is provided which extends radially inward of the cavity 88 from the second midplate 84 into juxtaposition with the radial cam surface 114, thus constraining the axial displacement of the control knob 112 in response to the force of the regulator spring 102 to a predetermined position dependent upon the degree of rotation of the said control knob 112 and its radial cam surface 114 relative to the detent 118.

In operation, assuming a source of supply pressure connected with the supply pressure inlet P5, the pressure in the regulator cavity will be dependent upon the force of the regulator spring 102, as selected by the axial position of adjusting screw 108 and rotary position and resulting axial displacement of the control knob 112, acting to seat the regulator diaphragm 90 on the annular exhaust seat 96 against the force generated on the regulator diaphragm 90 by the pressure in the regulator cavity 98. Should the pressure in the regulator chamber 98 and at the outlet port P6 be below the set point of the pressure regulator 76, the exhaust port P4 will be closed by the regulator spring 102 forcing the regulator diaphragm 90 to seat on the annular exhaust seat 96 and close the exhaust port P4. Thus, the pressure in the regulator chamber 98 and at the regulator outlet PR will build up to the preselected value, balancing the spring force with the force of the said pressure acting against the regulator diaphragm 90. Any tendency to exceed the set point will result in an upward displacement of the regulator diaphragm 90 against the action of the regulator spring 102, unseating the said diaphragm from the annular exhaust valve seat 96 and exhausting any pressure from the regulator chamber 98 which is of a magnitude in excess of the set point of the regulator 76. Thus, there will be a substantially constant regulated output pressure always present at the regulator output PR.

TEMPERATURE-TO-PRESSURE TRANSDUCER

Figure 7:
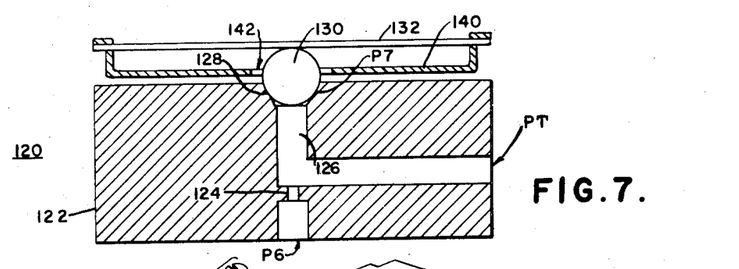
FIG. 7 is a cross-sectional structural schematic of a temperature to pressure transducer of the present invention.
Figure 8:
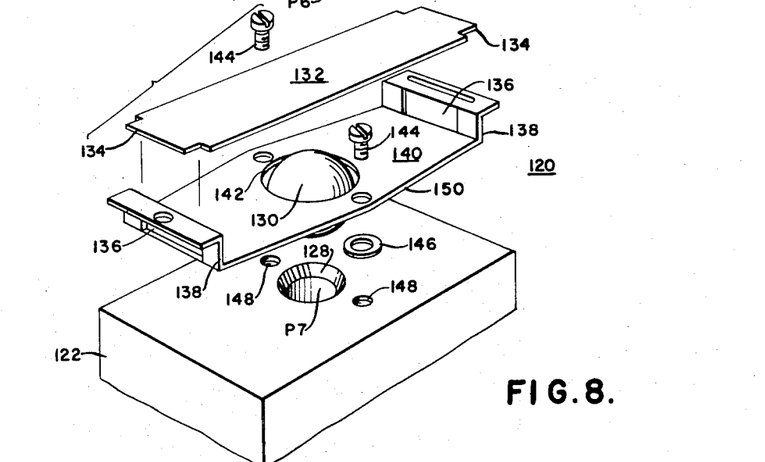
FIG. 8 is an exploded perspective view of the transducer of FIG. 7.

Referring in detail to FIGS. 7 and 8, a temperature-to-pressure transducer 120 is shown as including a base plate 122 having a supply pressure input P6 connected through an in-line flow restriction 124 to an internal pressure chamber 126, the latter being in communication with a transducer output port PT.

The internal pressure chamber P7 is further in communication with an exhaust port P7 including a countersunk annular valve seat 128 at its outer end, in which is mounted a spherical exhaust valve 130.

The exhaust valve 130 is maintained against the exhaust seat 128 by means of a temperature responsive first distortable element 132, which may comprise an elongated bi-metal strip or the like, mounted at its ends by means of integral tabs 134 inserted in receiving slots 136 in the upstanding end flanges 138 of a coextensive hold-down bracket comprising a second temperature distortable element 140. The second distortable element 140 includes an opening 142 through which the exhaust valve 130 extends into engagement with the underside of the first distortable element 132, and is secured to the base plate 122 by means of hold-down screws 144 and spacer washers 146 cooperating with tapped sockets 148 adjacent the exhaust port P7 in the base plate 122. The main body portion 150 of the hold-down bracket 140 is in the form of an elongated flat plate.

In operation, assuming a source of supply pressure connected with the supply port P6, pressure flows into the pressure chamber 126 through the restrictor 124 and forces the exhaust valve 130 off the exhust seat 128 and into engagement with the first distortable element 132. Thus, the unseating of the valve 130 provides a bleed rate from the chamber 126 proportional to the displacement of the valve 130 and regulates the output pressure at the transducer output PT as a function thereof.

As ambient temperature increases or decreases, the first and second distortable elements 132 and 140 effect a net displacement at the center thereof changing the relative displacement between the valve 130 and valve seat 128, causing a corresponding variation in pressure at the transducer outlet PT as a function of temperature. Hence, there is effected a temperature-to-pressure transducer function.

For example, with an increase in temperature, the first distortable element 132 will curl upward at its outer ends while the outer ends of the second element 140 will curl downward, causing a net downward force on the exhaust valve 130, a firmer closing of exhaust port P7 and an increase in the pressure at the transducer output P7. The reverse effect occurs as the temperature decreases, thus lowering the pressure at the transducer output PT. Thus, the pressure output of the transducer 120 is directly proportional to the change in ambient temperature being sensed thereby.

11. MODULAR CONTROL SYSTEMS

A. SINGLE TEMPERATURE THERMOSTAT

Figure 9:
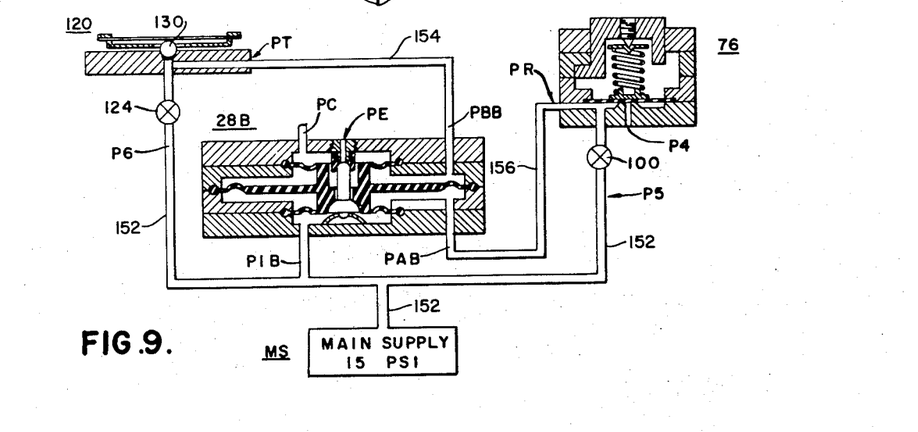
FIG. 9 is a schematic diagram of a single temperature fluid operated thermostat system of the present invention.

Referring now to FIG. 9, a single temperature thermostat system is shown as including three modular elements of the invention, namely, a pressure regulator valve 76, a comparator relay 28B and a transducer 120.

A source of supply pressure MS, for example 15 p. s. c., is commonly connected to the supply pressure inputs P1B, P5 and P6 of the system modules 28B, 76 and 120, respectively, by pressure channels 152.

The output PT of the transducer 120 is connected with the second comparator input PBB of the comparator relay 28B by a pressure channel 154.

The first comparator input PAB of the comparator relay 28B is connected with the output PR of the pressure regulator 76 by a pressure channel 156.

The branch or control pressure output of the comparator relay 28B is connected to the topwork of a conventional flow control valve or the like (not shown) for controlling the flow of heat exchange medium in the heating or cooling system being controlled by the single temperature thermostat system. Such a system sill be hereinafter generally and schematically described with reference to FIG. 12.

In operation, the pressure regulator 76 is adjusted to a preselected set point whereby the pressure at the regulator outlet PR and the first comparator input PAB of the relay 28B comprises a standard pressure for the thermostat system. Accordingly, variation in the ambient temperature at the transducer 120 results in a pressure at the transducer output PT and second comparator input PBB of the relay 28B which is compared with the standard pressure as previously defined in detail with reference to FIG. 4.

Thus, depending on the relative magnitudes of the pressures at the relay comparator inputs PAB and PBB, the control pressure at the relay control output PC will be modulated accordingly to control the flow of heat exchange medium or the like in the system being controlled.

In the system as shown in FIG. 9, with the transducer 120 functioning as defined with reference to FIGS. 7 and 8, the control pressure at the relay control output will change in magnitude in a directly proportional manner to ambient temperature changes. Thus, the system is said to be direct acting.

Inverse functioning, or reverse acting, systems are effected merely by reversing the connections of the pressure channels 154 and 156 from those above-described to the first and second relay comparator inputs PAB and PBB, respectively.

Thus, the single temperature thermostat system will function as a suitable control for either heating or cooling systems merely by reversing the input connections of the comparator relay module 28B.

It is important that the proper throttling range of a thermostatic system can be readily established; the throttling range expressing the relationship between the amount of temperature variation and hence, pressure change at the transducer output PT which will effect a full range swing of control pressure at the control output PC of the relay module 28B. As a specific example, the number of degrees of temperature change which will effect a three (3) to fifteen (15) pound pressure swing at the control output PC.

If the throttling range is too narrow, the thermostat of FIG. 9 will cease to be a modulating type control and simply become an on-off type control, resulting in severe hunting of the controlled temperature in the associated heating or cooling system. Conversely, if the throttling range is too wide, there will be a noticeable offset or drop in the controlled temperature in response to ambient variations since there will be insufficient response of the system to modulate the control pressure at the control output PC in response to normal ambient temperature variations.

Thus, referring additionally to the previous description of FIGS. 4 and 5A–5C, the importance of the adjustable exhaust valve seat 72–74 now becomes readily apparent.

By adjusting the said exhaust seat 72–74 to change the effective area of the intermediate diaphragm 14BB of the comparator relay 28B, the relative response of the said relay (i.e. the relay ratio) to the pressure at the transducer output PT may be selectively varied to effect the proper magnitude of pressure change at the control output PC of the said relay 28B. This is readily accomplished under field conditions and relieves a long standing problem in the art requiring factory pre-setting of throttling range characteristics in such systems.

A further advantage of the purely pneumatic or pressure interconnections of the various modules 28B, 76 and 120, is that there is no necessity for close proximity of these modules, all mechanical linkages having been obviated by the present invention. This advantage, as well as the versatility provided by the new and novel throttling range adjustment described above are attendant advantages of the other systems of this invention to be hereinafter more fully described.

B. DAY-NITE THERMOSTAT

Figures 10, 12:
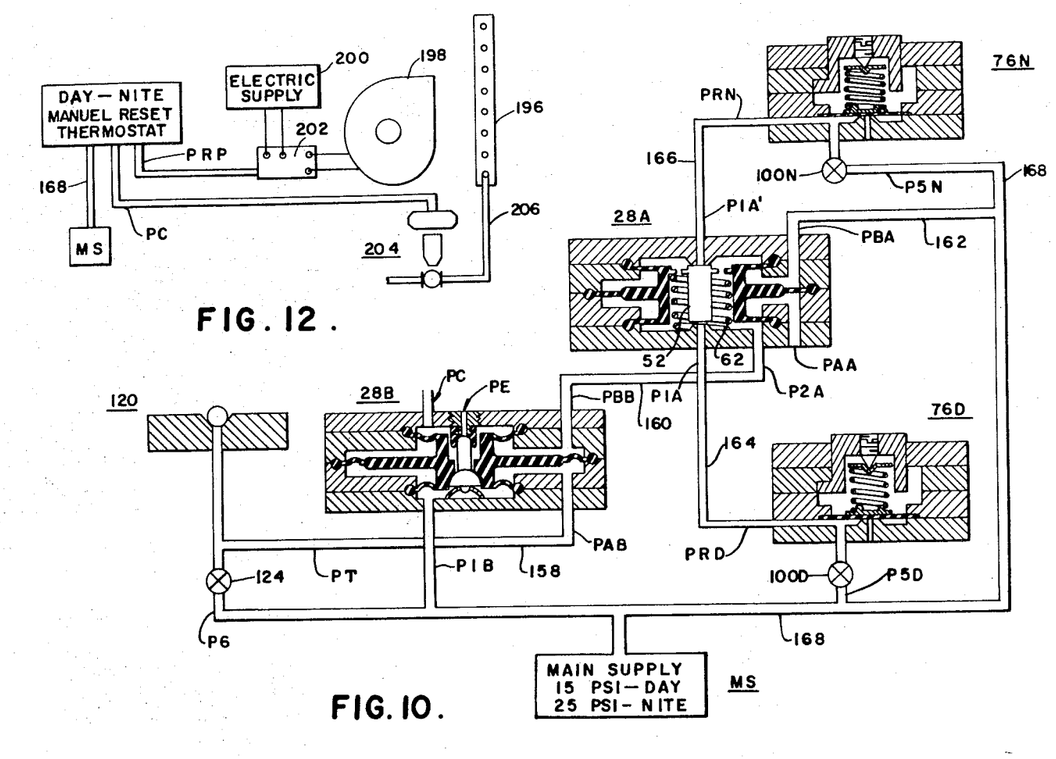
FIG. 10 is a schematic diagram of a day-night fluid operated thermostat system of the present invention.
FIG. 12 is a general schematic of a heating or cooling control system specifically including the thermostat system of FIGS. 11 and 11A but generally illustrative of the application of the other embodiments of the thermostat system herein to heating and/or cooling control systems.

A "day-nite" thermostat system under the present invention is readily provided by the use of several of the previously described system modules of FIGS. 1–8 and with specific reference to FIG. 10 is shown as including first and second pressure regulator modules 76D and 76N for "day" and "nite" control, respectively, a diverting relay module 28A, a comparator relay module 28B and a transducer module 120.

The transducer output PT is connected with the first comparator input PAB of the comparator relay 28B by a pressure channel 158.

The second comparator input of the comparator relay 28B is connected with the output port P2A of the diverting relay 28A by a pressure channel 160.

In the diverting relay 28A, the first comparator input PAA is open to atmosphere; the second comparator input PBA is connected to the main supply MS by a pressure channel 162; the first pressure input port P1A is connected with the first regulator output PRD by a pressure channel 164; and the second pressure input port P1A' is connected with the second regulator output PRN by a pressure channel 166.

The main pressure supply MS is commonly connected to the transducer input P6, comparator relay input P1B, first regulator input P5D and second regulator input P5N by means of pressure channel 168.

In operation, the main supply MS is designed to supply a first pressure (15 p.s.i.) for "day" operation and a second higher pressure (25 p.s.i.) for "nite" operation.

Accordingly, the first regulator module 76D is adjusted to a desired "day" set point and the second regulator module 76N is adjusted to a desired "nite" set point. Now, as will be fully described, all that is necessary to switch between "day" and "nite" operation is to vary the main supply pressure and the system of FIG. 10 will automatically switch to and operate in the "day" or "nite" modes as determined merely by the value of supply pressure and the respective set points of the regulator modules 76D and 76N.

In the position shown in FIG. 10, the diaphragm assembly valve stem 52 in the diverting relay 28A is in closed position over the second pressure input P1A', precluding the admission to the diverting relay of the "nite" set point pressure from the second regulator output PRN. This is effected since the spring 62 of the diverting relay is sufficiently strong to overcome the effect of the lower "day" main pressure entering the second comparator port PBA from the channel 162.

Consequently, the "day" set point pressure from the first regulator output PRD enters the diverting relay 28A through the pressure channel 164 and first input port P1A and passes out through the output port P2A thereof into the second comparator input PBB of the comparator relay 28B. Thus, the diverting relay 28A provides a first standard set point pressure to the comparator relay 28B for comparison with the output pressure from the transducer output PT, the said first set point pressure being derived from the first regulator module 76D.

The system then functions identically as described with reference to FIG. 9.

To convert to the "nite" mode of operation, the main supply pressure is increased and the force of the spring 62 in the diverting relay 28A is insufficient to oppose the increased main pressure entering the second comparator input PBA, causing the valve stem 52 to shift downwardly, closing the first input port P1A and opening the second input port P1A'. Thus, the second set point pressure from the second regulator output PRN enters the diverting relay through the second inlet port P1A' and exits through the output port P2A and pressure channel 160, from whence it enters the second comparator input PBB of the comparator relay 28B.

This results in a new set point constraint being placed on the comparator relay 28B and the control pressure at the control output PC is modulated accordingly until the new constraint is satisfied and the system is balanced.

To effect inverse functioning of the "day-nite" system of FIG. 10, the connection of pressure channels 158 and 160 to the first and second comparator inputs PAB and PBB, respectively, of the comparator relay 28B are merely reversed. Thus, "day-nite" control of either heating or cooling systems is readily effected.

C. DAY-NITE THERMOSTAT WITH MANUAL RESET

Figures 11, 11A:
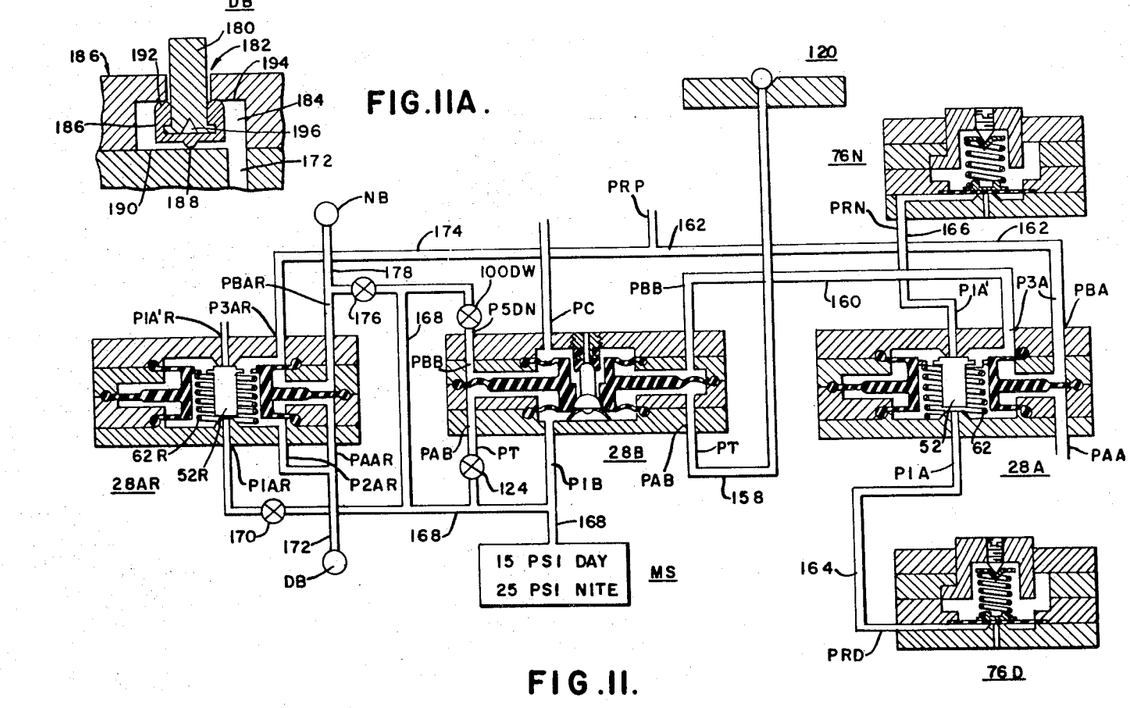
FIG. 11 is a schematic diagram of a day-night fluid operated thermostat system of the present invention including manual override means.
FIG. 11A is a cross-sectional structural schematic of a manual override means detail of FIG. 11.

Referring now to FIG. 11, a modification of the embodiment of FIG. 10 permitting manual reset of the system from the "nite" to "day" mode and vice-versa when the main supply MS is set for the "nite" mode will be described.

The "day-nite" system with manual reset includes the "day" regulator module 76D, the "nite" regulator module 76N, the diverting relay module 28A and the comparator relay module 28B, interconnected as previously described with reference to FIG. 10, in addition to a reset controlling diverting relay module 28AR.

In order to avoid crossing of pressure channels on the drawing and ease of connection, the first and second comparator inputs PAB and PBB of the comparator relay 28B are shown in duplicate, one on each side of the comparator relay 28B but having the same internal connections and functions.

Further, all pressure connections which in FIG. 11 may pass completely through the various modules but which retain the same functions as those of FIG. 10 bear identical numerals to FIG. 10. In this regard, some of the connections of the several modules become coincident and accordingly, bear double designations where appropriate.

Further, the first output port P2A of the diverting relay 28A is omitted and the alternate output port P3A, described in detail in FIG. 3B, is connected to the pressure channel 160 and through same to the second comparator inlet PBB of the comparator relay 28B.

The reset control diverting relay 28AR has main pressure supplied thereto through pressure channel 168, flow restrictor 170 and the first pressure inlet P1AR thereof, the second pressure inlet P1A'R being selectively open to atmosphere by the diaphragm valve stem 52R as will be hereinafter described.

The reset control diverting relay 28AR has its first pressure output port P2AR connected with its first comparator input PAAR, both being commonly connected through a pressure channel 172 to a "day" reset button DB; its second pressure output port P3AR connected with a pressure channel 174 which together with the pressure channel 162 from the second comparator input PBA of the diverting relay 28A is connected to a reset pressure output PRP; and its second comparator input PBAR connected with the main pressure supply MS through a flow restrictor 176 and the main pressure channel 168 as well as through a pressure channel 178 to a "nite" reset button NB.

Referring to FIG. 11A, a "day" button DB, which is identical with the "nite" button NB, is shown as comprising a cylindrical push-button 180 extending through an exhaust port 182 into a pressure chamber 184 in a housing 186, which may comprise a portion of the reset control diverting relay module 28AR or a separate (remote) housing unit or push-button console; and a resilient sleeve 186 surrounding the inner end of the button 180 and mounted thereon by a snap-fit or the like, the said sleeve including an integral, resilient, axially extending boss 188 engaging an inner wall 190 in the chamber 184 and an integral, annular, resilient shoulder 192 abutting an opposite wall 194 of the chamber 184 about the periphery of the exhaust port 182. The button 180 includes an axial cavity 196 immediately behind the resilient boss 188, permitting the button 180 to be manually depressed, compressing the boss 188 into the cavity 196, thereby unseating the annular shoulder 192 from the wall 194 and permitting pressure in the chamber 184 to exhaust to atmosphere through the exhaust port 182.

The chamber 184 is in communication with the main supply pressure by means of the pressure channel 172 previously described with reference to FIG. 11.

Referring now to FIG. 12, a schematic of a temperature control system for a space such as a classroom in a school building or the like incorporating the thermostat system of FIG. 11 is shwon as including a heat exchanger 196, an asssociated blower 198 connected with an electrical source 200 through a pressure actuated switch 202, and a heat exchange medium flow control valve 204 controlling the flow of such medium into the exchanger 196 through a flow duct 206.

The top work of the flow control valve 204 is connected with the control pressure output PC of the thermostat, while the pressure sensitive switch 202 controlling the blower 198 is connected with the reset pressure output PRP of the thermostat.

For "nite" operation, the blower, for example, can be closed down as a result of the pressure switch 202 cutting off in response to the higher "nite" main pressure value. However, as will be further explained in connection with the operation of FIG. 11, when the "day" button DB is depressed, the pressure at the reset pressure output PRP drops and permits the pressure switch 202 to energize the blower 198 from the source 200.

Further, "nite" operation includes a reduced flow of heat exchange medium into the exchanger 196 through the valve 204 and duct 206. The actuation of the "day" button results also in an increase in control pressure at the control output PC which in turn modulates the valve 204 to change the flow rate of exchange medium into the heat exchanger 196.

This system thus permits individual control of the mode of temperature control in a room in a large building or room complex while the rest of the building is operating in a predetermined mode other than the one desired.

The system of FIG. 12, with the exception of the reset output PRP is a general example of the type of system readily controllable by the thermostatic systems of FIGS. 7, 10, 11 and 13, the later to be hereinafter more fully described.

In operation, the system of FIG. 11 is shown in the "day" mode, pressure from the output PT of transducer module 120 being compared in the comparator relay module 28B with the set point pressure from the regulator output PRD of the "day" regulator module 76D, to effect a functionally related control pressure at the comparator relay control output PC.

To effect "nite" operation, the pressure source MS is constrained to increase its pressure output in the channels 168 from, for example, 15 PSI to 25 PSI. This pressure change passes through the channels 168 through the flow restrictors 170 and 176 into the first and second comparator inputs PAAR and PBBR of the reset diverting relay module 28AR, maintaining the normal or quiescent position shown therein of the valve stem 52R by means of the biasing spring 62R. Main pressure further flows out of the reset module 28AR through the second output port P3AR and channel 174 to the reset output PRP as well as through the channel 162 to the second comparator input PBA of the diverting relay module 28A.

As previously described with reference to FIG. 3B and the foregoing systems, this increase in main pressure shifts the diverting relay valve stem 52 against the action of the biasing spring 62 to close the first ("day") inlet port P1A and open the second ("nite") inlet port P1A'. Thus, the "nite" set point pressure from the regulator output PRN of the "nite" regulator module 76N is transmitted to the second comparator input PBB of the comparator relay module 28B and the control pressure at the control pressure output PC is modulated accordingly to satisfy the "nite" set point constraint.

To effect manual reset from "nite" to "day" operation, the "day" button DB is depressed, exhausting all of the pressure from reset diverting relay 28AR to atmosphere except for that in the second comparator chamber thereof (as supplied through the second comparator input PBAR). Pressure is also exhausted from the reset output PRP and the second comparator chamber (fed by the channel 162 and the second comparator input PBA) of the diverting relay 28A.

In the reset relay 28AR, the biasing spring 62R is overcome and the valve stem 52R closes the supply inlet P1AR, latching the second supply inlet P1A'R open to atmosphere.

In the diverting relay 28A the spring 62 resets the said relay 28A to the "day" position by forcing the valve stem 52 upward to close the second input port P1A'.

Therefore, until subsequently disturbed, the system is locked in the "day" mode of operation, regardless of the increased value of the main supply pressure.

To permit resumption of the "nite" mode of operation, the "nite" button NB is depressed, exhausting the pressure at the second comparator input PBAR of the reset relay 28AR to atmosphere. As a result, the reset relay 28AR switches back to the previously defined quiescent or normal position (as shown); reset pressure is restored in the channels 174 and 162, at reset output PRP and at the second comparator input PBA of the diverting relay module 28A, thus switching same back to the "nite" position.

Had the reset operation been left in the "day" position, the return of the entire system to "day" operation would be automatically effected upon reduction of the main supply pressure to the lower (15 PSI) "day" value, and subsequently, upon another increase in main supply pressure to the higher (25 PSI) "nite" value, the entire system would be shifted to the night cycle.

Further, it can be readily seen that by the provision of the "day" and "nite" buttons DB and NB, and the particular interconnections shown in the reset module 28AR, the basic diverting relay module 18A may be readily converted to a latching relay.

The importance of the flow restrictors 170 and 176 associated with the "day" and "nite" buttons DB and NB, respectively, of the reset module 28AR becomes readily apparent with the realization that these restrictors prevent exhausting of main supply pressure from the common supply leads 168 and thus, preclude supply pressure fluctuation and spurious activation or disturbance of the rest of the thermostat system.

D. HEATING-COOLING THERMOSTAT

A thermostat system for controlling both heating and cooling functions, often referred to as a "summer-winter" thermostat, will not be described with reference to FIG. 13.

In a heating system, where a warm heat exchange medium is being utilized, it is desired to decrease the flow of exchange medium with an increase in temperature. In a cooling system, however, where a cool heat exchange medium is being utilized, it is desired to increase the flow of exchange medium with increasing temperature. Therefore, in a combined system wherein a common system is used for both types of exchange medium, the respective control functions are necessarily relatively inverse in order that a common flow control valve can properly modulate the flow of the respective exchange mediums in the system.

Figure 13:
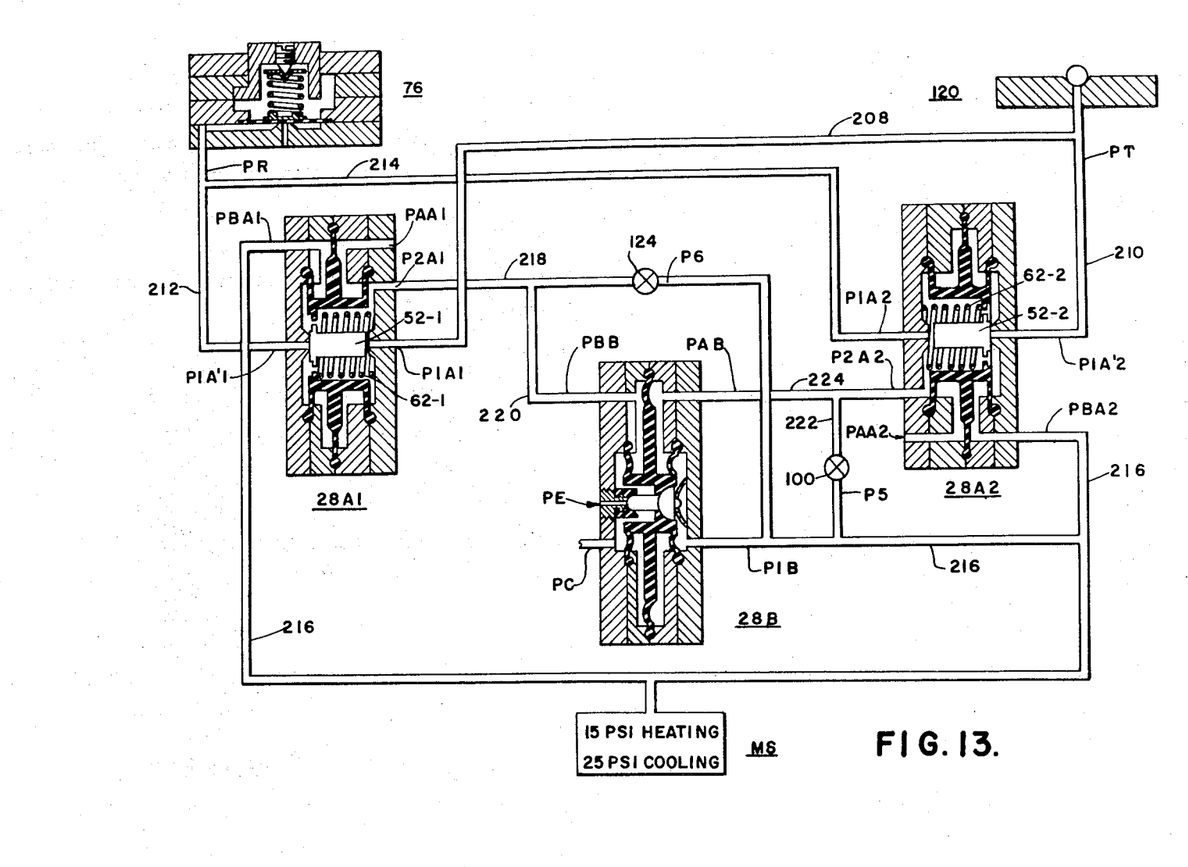
FIG. 13 is a schematic diagram of a summer-winter (heating-Cooling) thermostat system of the present invention.

Accordingly, the system of FIG. 13 effects an automatic switching from a direct acting to a reverse acting system in response to a change in the magnitude of the main supply pressure, wherein, for example, 15 PSI is utilized for a heating control function and 25 PSI is utilized for a cooling control function.

Referring in detail to FIG. 13, the heating-cooling thermostat system is shown as including a pressure regulator module 76, a transducer module 120, a comparator relay module 28B and first and second diverting relay modules 28A1 and 28A2.

The transducer output PT is connected through pressure channels 208 and 210, respectively, to the first pressure input P1A1 of the first diverting relay 28A1 and the second pressure input P1A'2 of the second diverting relay 28A2.

The pressure regulator output PR is connected through pressure channels 212 and 214, respectively, with the second pressure input P1A'1 of the first diverting relay 28A1 and the first pressure input P1A2 of the second diverting relay 28A2.

The main pressure supply MS is connected through common pressure channels 216 to the second comparator inlets P1A1 and PBA2 of the first and second diverting relays 28A1 and 28A2, respectively, the respective first comparator inlets PAA1 and PAA2 of the said diverting relays being open to atmosphere.

The supply pressure input P6 and its associated flow restrictor 124 of the transducer 120 serve as the main pressure supply connection for the transducer 120 through a pressure channel 218, first output port P2A1 of the first diverting relay 28A1 and the said pressure channel 208 in the position shown in FIG. 13. The said first output port P2A1 of the first diverting relay 28A1 is also connected to the second comparator input PBB of the comparator relay 28B through a pressure channel 220 commonly connected with the channel 218 and restrictor 124.

The supply pressure input P5 and associated flow restrictor 100 serve as the main pressure supply connection for the pressure regulator 76 through a pressure channel 222 commonly connected by a pressure channel 224 to the first comparator input PAB of the comparator relay 28B and the second output port P2A2 of the second diverting relay 28A2, the latter, in the position shown, transferring pressure from its first output port P2A2 through its first input port P1A2 and channel 214 to the pressure regulator 76.

In operation, the system as shown in FIG. 13 is operating in the heating mode, the main supply pressure being at its lower heating mode value and being insufficient to overcome the force of the springs 62–1 and 62–2 to move the diaphragm valve stems 52–1 and 52–2 from their normally closed positions over the second pressure inlet ports P1A′1 and P1A′2 of the first and second diverting relays 28A1 and 28A2, respectively. Thus, as shown, the output pressure from the transducer output PT is transmitted by the first diverting relay 28A1 from its first output port P2A1 through channels 218 and 220 to the second comparator inlet PBB of the comparator relay 28B; the output pressure from the regulator output PR is transmitted by the second diverting relay 28A2 from its first output port P2A2 through channel 224 to the first comparator input PAB of the comparator relay 28B; and the differential (comparison) of the two pressures in the comparator relay 28B thereby effects a modulation of the control pressure at the control output PC to satisfy the set point constraint established by the pressure regulator 76.

To convert the system to the cooling mode, the pressure from the main supply MS is increased to its higher (25 PSI) value and the first and second diverting relays 28A1 and 28A2 are switched from the normally closed position shown in FIG. 13, by the action of the increased supply pressure overcoming the force of the first and second biasing spring 62–1 and 62–2, thereby closing the respective first input ports P1A1 and P1A2 and opening the respective second input ports P1A1 and P1A′2. As a result of this switching action, the set point pressure from the regulator output PR is transmitted to the second comparator input PBB of the comparator relay 28B and the pressure from the transducer output PT is transmitted to the first comparator input PAB of the comparator relay 28B.

This comprises a reversal of the comparator input connections of the comparator relay 28B in the cooling mode with respect to those connections in the heating mode for the system, and the proportionate response of the said comparator relay 28B in the cooling mode is inversely related to its response in the heating mode.

Thus, changeover from a "winter" to a "summer" type operation of the system is effected purely by a change in main supply pressure, precluding all mechanical adjustments and precluding the need for any lever or linkage systems in the transducer module 120. Further, the same system can readily convey either heating or cooling heat exchange medium, precluding the need for parallel systems or transducer duplication.

In all of the foregoing systems, the throttling range adjustment provided in the comparator relay 28B gives wide versatility and ease of field adjustment to the said systems, precluding the need for factory setting of the throttling range.

Further, all of the modules of the various systems comprise one or more of each of four control modules with the exception of the simple single-temperature system of FIG. 9, the latter utilizing only three control modules, no diverting relay modules being required. None of these systems require mechanical levers or linkages between modules, the operation being entirely by fluid pressure.

What is claimed is:

1. In a pneumatic control system having a plural pressure level pneumatic source, a pneumatically operated device and a pneumatically operated control means for interconnecting a signal from said source to said device in relation to the degree of operation of said control means, the improvement comprising a single condition responsive means operatively associated with said control means for effecting the degree of operation of said control means in relation to the condition being sensed by said condition responsive means regardless of which pressure level is being provided by said source, and a single pneumatically operated set point adjustor means operatively associated with said control means for effecting the degree of operation of said control means in relation to the setting of said set point adjustor means regardless of which pressure level is being provided by said source.

2. In a pneumatic control system as set forth in claim 1, the further improvement wherein said condition responsive means is responsive to temperature.

3. In a pneumatic control system as set forth in claim 2, the further improvement wherein said condition responsive means comprises a bleed valve construction.

4. In a pneumatic control system as set forth in claim 3, the further improvement wherein said bleed valve construction comprises a valve seat device, a ball valve member for opening and closing the valve seat of said valve seat device, and temperature responsive means controlling movement of said ball valve member relative to said valve seat.

5. In a pneumatic control system as set forth in claim 4, the further improvement wherein said temperature responsive means comprises a bimetal arrangement.

6. In a pneumatic control system as set forth in claim 1, the further improvement wherein switching means are provided for switching the effect of said condition responsive means on said control means in response to the particular pressure level of said source being utilized in said system.

7. In a pneumatic control system as set forth in claim 6, the further improvement wherein said switching means cause said control means to switch between a direct acting function and a reverse acting function.

8. In a pneumatic control system as set forth in claim 1, the further improvement wherein said single set point adjustor means comprises an adjustable pressure regulator.

9. In a method for operating a pneumatic control system having a plural pressure level pneumatic source, a pneumatically operated device and a pneumatically operated control means for interconnecting a signal from said source to said device in relation to the degree of operation of said control means, the improvement comprising the steps of effecting the degree of operation of said control means in relation to the condition being sensed by a single condition responsive means that is operatively associated with said control means regardless of which pressure level is being provided by said source, and effecting the degree of operation of said control means in relation to the setting of a single pneumatically operated set point adjustor means that is operatively associated with said control means regardless of which pressure level is being provided by said source.

10. In a method as set forth in claim 9, the further improvement wherein said condition responsive means is responsive to temperature.

11. In a method as set forth in claim 10, the further improvement wherein said condition responsive means comprises a bleed valve construction.

12. In a method as set forth in claim 11, the further improvement wherein said bleed valve construction comprises a valve seat device and a ball valve member for opening and closing the valve seat of said valve seat device, and controlling movement of said ball valve member relative to said valve seat with a temperature responsive means.

13. In a method as set forth in claim 12, the further improvement wherein said temperature responsive means comprises a bimetal arrangement.

14. In a method as set forth in claim 9, the further improvement comprising the step of switching the effect of said condition responsive means on said control means in response to the particular pressure level of said source being utilized in said system.

15. In a method as set forth in claim 14, the further improvement wherein said switching step causes said control means to switch between a direct acting function and a reverse acting function.

16. In a method as set forth in claim 9, the further improvement wherein said single set point adjustor means comprises an adjustable pressure regulator.

* * * * *